United States Patent [19]

Guyer

[11] 4,037,942
[45] July 26, 1977

[54] OPTICAL ADJUSTMENT DEVICE
[75] Inventor: Robert Charles Guyer, Beverly, Mass.
[73] Assignee: RCA Corporation, New York, N.Y.
[21] Appl. No.: 668,413
[22] Filed: Mar. 19, 1976
[51] Int. Cl.² .............................................. G02B 5/08
[52] U.S. Cl. ..................................... 350/285; 350/288
[58] Field of Search ..................... 331/94.5 C, 94.5 D; 350/285, 288, 310, 6; 248/474, 476, 479

[56] References Cited
U.S. PATENT DOCUMENTS

| | | | |
|---|---|---|---|
| 2,137,286 | 11/1938 | Herbig | 248/479 X |
| 3,718,868 | 2/1973 | Pao et al. | 350/6 X |
| 3,775,700 | 11/1973 | Garman et al. | 331/94.5 D |

Primary Examiner—F. L. Evans
Attorney, Agent, or Firm—H. Christoffersen; Samuel Cohen; William Squire

[57] ABSTRACT

A pair of tapered rotatable wedge members are wedged against an optical element which in turn is resiliently mounted to pivot in response to the rotation of either or both of the wedge members. Rotation of one or more of the wedge members aligns the optical axis of the element to a given system optical axis. The optical element in the embodiment disclosed is a mirror forming a resonator with a laser rod whose axis is to be aligned with the mirror optical axis.

6 Claims, 11 Drawing Figures

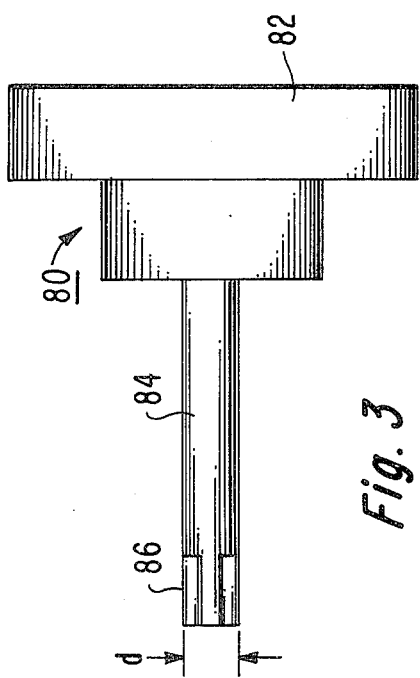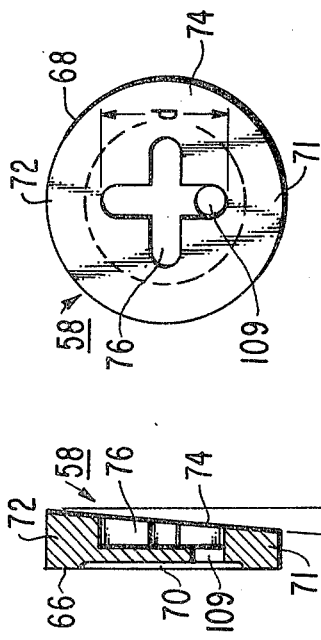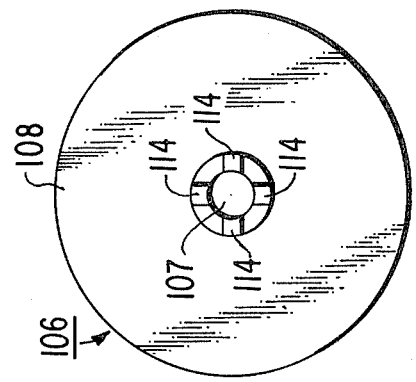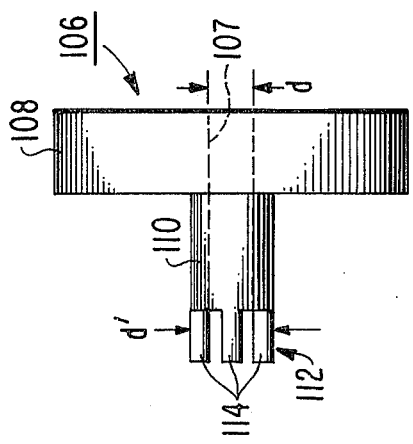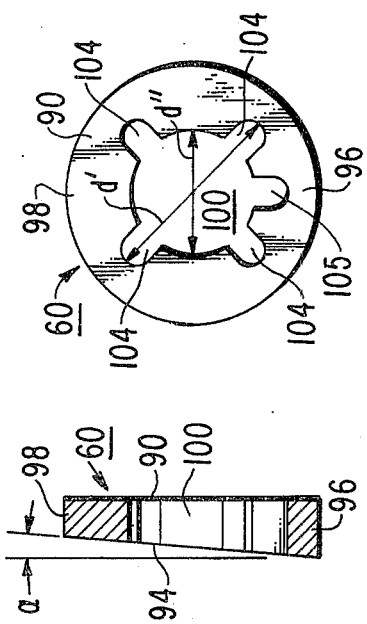

OPTICAL ADJUSTMENT DEVICE

The Government has rights in this invention pursuant to Contract DAAB07-74-C-0270 awarded by the Department of the Army.

BACKGROUND OF THE INVENTION

1. Field of the Invention

The present invention relates to an optical adjustment device for aligning the optical axes of elements in an optical system.

2. Description of the Prior Art

Prior art optical systems generally utilize screw-type adjustment devices for aligning the various optical elements. Usually it is best to design the system so that each of the optical elements are mounted in a given fixed relationship.

In very critical optical systems for example, in laser systems, where the alignment of the optical axes in precise, adjustments usually are necessary due to the wide tolerances in the mounting components. These components may include laser rods, mirrors and Q-switches which require precise relative positioning.

To manufacture mounting components in an optical system having precise optical alignment requirements requires costly mechanisms or relatively expensive fabrication techniques. In addition, the adjustment arrangements involving screw-type devices are relatively cumbersome and can be unstable for very fine adjustment in the order of arcseconds. Instability may also be present due to temperature fluctuations and mechanical hysteresis.

SUMMARY OF THE INVENTION

An optical element having a given optical axis is resiliently mounted. First and second wedge members are provided each having a first planar surface tapering toward a second planar surface thereof. The second surfaces have a given spaced relationship when the first surfaces are contiguous. Means are provided for rotatably mounting the members and for wedging the first member between the second member and the element with the first surfaces contiguous. The wedging means and the members are arranged so that each member can rotate with respect to the other member. The rotation of each of the members pivots the optical axis of the element. Means are provided coupled to the members for rotating each wedge member with respect to the other wedge member.

BRIEF DESCRIPTION OF THE DRAWING

FIG. 2a is a sectional side view and FIG. 2b is a front elevational view of a wedge member shown in the embodiment of FIG. 1, FIG. 3 is a side elevational view of a tool useful in rotating the wedge member of FIGS. 2a and 2b.

FIG. 4a is a side elevational view and FIG. 4b is a front elevational view of a second wedge member shown in the embodiment of FIG. 1, FIG. 5a is a side elevational view and FIG. 5b is a front elevational view of a tool useful in rotating the wedge member of FIGS. 4a and 4b, FIGS. 6, 7 and 8 are illustrations useful in explaining the principles of the present invention.

DETAILED DESCRIPTION OF THE PREFERRED EMBODIMENT

Figure 1:
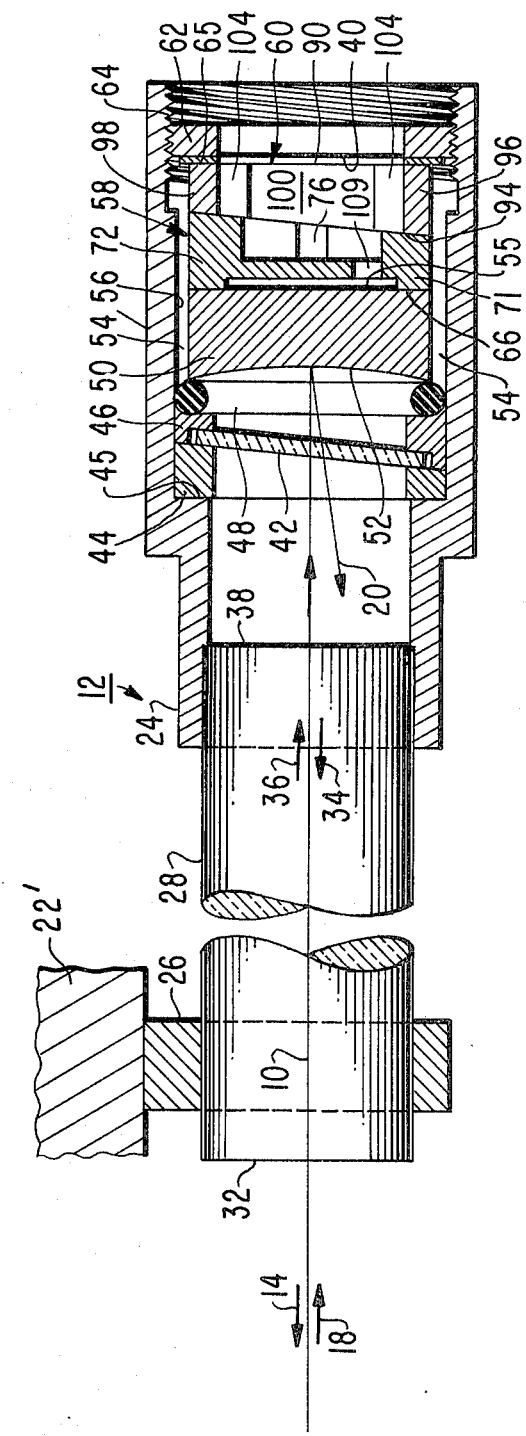
FIG. 1 is a partial sectional elevational view of an apparatus constructed and operated in accordance with an embodiment of the present invention.

In FIG. 1 a laser transmitting module 12 includes housing 22'. Housing 22' supports an elongated stepped ferrule 24 through flange 26 and laser rod 28. Laser rod 28 is disposed in the narrower end of ferrule 24. Rod 28 is a small cylindrical rod of laser material preferably made of YAG doped with Neodymium. Optical surface 32 of rod 28 has 50% transmission along axis 10. Light energy generated in the laser rod 28 and propagating in the direction 34 is 50% reflected in direction 36 by surface 32 and 50% transmitted into the ambient in direction 14 by surface 32. Surface 32 is highly polished, and planar. The normal to surface 32 defines axis 10. Axis 10 is parallel to and coincident with the longitudinal axis of ferrule 24 extending through the hollow core thereof. Surface 38 of rod 28 transmits 100% of the light energy generated by rod 28 in the direction 36.

Disposed in the cylindrical bore of ferrule 24 is a Q-switch 42. Switch 42 is a device which blocks the transmission of light energy in the direction 36 until the energy in the light beam has a minimum power. At that time the Q-switch becomes transmissive to the light energy, passing the beam. Switch 42 can be any conventional Q-switch device, but is preferably a chemical dye wafer which turns transparent at the correct power level to produce a laser pulse. Q-switch 42 can be a cellulose acetate composition commercially available from the Eastman-Kodak Corporation, Rochester, New York. Other Q-switches may include electronic switching devices and the like. Switch 42 is disposed between two annular rings 44 and 46 which clamp the switch 42 therebetween. Annular rings 44 and 46 in turn are secured against ferrule shoulder 45 within the core of ferrule 24 by suitable means. Disposed against ring 46 within the core of ferrule 24 is an O-ring 48. O-ring 48 is a well known rubber ring or other flexible resilient material having a circular cross section. Disposed on the other side of O-ring 48 remote from ring 46 is a mirror 50 which has a highly polished mirror surface 52. Surface 52 reflects 100% of the impinging light energy emitted by the rod 28. For purposes of illustration the optical axis 20 is the reflected axis of the incident light impinging upon the surface 52 of mirror 50. Axis 20 is displaced from axis 10 in exaggeration to illustrate a missalignment between the optical axis 20 of the reflecting surface 52 and axis 10.

The optical adjustment device of the present invention aligns the axis 20 of mirror 50 in coincidence with the axis 10 within arc seconds. The surfaces 32 and 52 form a laser resonator with rod 28.

Mirror 50 is a cylindrical member which is smaller in diameter than the inner bore diameter of ferrule 24 at the location in which the mirror is disposed. A small gap 54 is present between the mirror 50 outer diameter and the inner cylindrical surface 56 of ferrule 24. Gap 54 permits the mirror 50 when wedged against the O-ring 48 to resiliently float within the ferrule 24 core while at the same time being relatively stiffly suspended in that wedged position. O-ring 48 permits mirror 50 to pivot when so forced in a manner to be explained but the mirror otherwise remains in that position in the presence of severe vibrations. The O-ring 48 in contact with the mirror surface 52 restrains the mirror 50 from rotating when torquing adjustments are made to the wedge members 58 and 60. If the mirror 50 is allowed to rotate, the inherent wedge angle between surfaces 52 and 55 will interfere with the controlled adjustment provided by the wedge members 58 and 60. Rotation of mirror 50 can prevent the aligning of mirror surface 52 parallel to rod surface 32.

As provided in accordance with the present invention, a pair of disc-like wedge members 58 and 60 are disposed within the core of ferrule 24 with the wedge member 58 wedged between mirror 50 and wedge member 60. The wedge members are made of any suitable material, preferably metal. Threaded ring 62 engages the internally threaded core 24 at threads 64 wedging members 58 and 60 and mirror 50 serially against O-ring 48 in the order illustrated. A suitable washer 65 may be disposed between ring 62 and wedge member 60.

In FIG. 2a, wedge member 58 has a first planar surface 66 which is highly polished. Surface 66 has an undercut 70 which forms surface 66 into a ring. The rear planar surface 55 of mirror 50 (FIG. 1) is higly polished and normal to axis 20. Surface 66 butts against surface 55. Wedge member 58 tapers such that end 71 is narrow with respect to end 72, FIG. 2a. Narrow end 71 is identified as such by hole 109. Surface 74 of member 58 tapers from the thickest end 72 towards surface 66 and the thinnest end 71. Surface 74 is disposed at wedge angle $\alpha$ with the surface 66. Surface 66 when butting against mirror 50 surface 55 is normal to axis 20 of mirror 50. As seen in FIGS. 2a and 2b tapered surface 74 is formed with a cross-shaped recess 76. Recess 76 is shaped to receive the tool 80 male member 86, FIG. 3. Tool 80 includes a handle 82 and a shaft 84. Shaft 84 has a cross-shaped male member 86 which is configured to engage the female cross-shaped recess 76 in member 58.

Wedge member 60, FIG. 4a, has a planar surface 90 which is polished. Member 60 is received within the core of ferrule 24 as shown in FIG. 1. Member 60 has a planar surface 94 which tapers from thickest end 96 towards surface 90 and thinnest end 98. Surface 94 is disposed at wedge angle $\alpha$ with the plane of surface 90. $\alpha$ may be any suitable value in accordance with a particular application. In this case, $\alpha$ is about 6 arc minutes. When the surfaces 94 and 74 of members 50 and 58, respectively, are contiguous and engaged, the surface 66 of member 58 and surface 90 of member 50 are parallel to each other when respective thin end 98 and thick end 72 are adjacent. Member 60 includes aperture 100 which extends from surface 90 to surface 94. Aperture 100 has a minimum diameter $d$ inches which is greater than the diameter $d$ of shaft 84 of tool 80 and the maximum transverse dimension $d$ of recess 76. This minimum diameter $d$ inches permits the shaft 84 to be extended through the aperture 100 without interference with member 60 and permits rotation of the tool 80 when disposed in aperture 100. Disposed adjacent aperture 100 and in communication therewith are a plurality of radially outwardly extending keying slots 104. The oppositely disposed slots 104 have a maximum diameter $d$ feet greater than the dimension $d$ inches.

The tool 106 of FIGS. 5a and 5b has a handle 108 and a shaft 110 with a male key 112 which is arranged to engage the keying slots 104 in member 60. As best seen in FIG. 5b the key 112 has a plurality of male ribs 114 disposed diametrically opposite each other for engagement with respective ones of slots 104. An additional slot 105 is provided member 60 to identify readily the thick end 96 of member 60. When the male key 112 of tool 106 is engaged with the recess 100, member 60 can be readily turned by way of handle 108. Tool 106 also has a hollow bore 107 having a diameter $d$ to receive the shaft 84 of tool 80.

Due to tooling and manufacturing variances in the dimensions of the ferrule 24, ring 62, installation of rod 28, and dimensions of flange 226 and ferrule 24, the axis 20 of the mirror 50 is usually misaligned with the axis 10 of rod 28 surface 32. The wedge members 58 and 60 when rotated can correct the alignment of axis 20 into coincidence with the axis 10 within six arc seconds as will be explained.

To align axis 20 with axis 10 the following procedure is utilized. In the initial assembly configuration wedge members 58 and 60 are each disposed with the tapered surfaces 74 and 94, respectively, contiguous with each other with the thick end 72 of member 58 adjacent the thin end 96 of member 60. In this orientation, surfaces 66 and 90 are parallel. The axis 20 is observed by suitable optical means. If the power output from the rod 28 resonator which is pumped in a conventional manner is not a maximum, then it is evident that the axes 20 and 10 are not aligned. When the module 12 of FIG. 1 is used, for example, in a range finder application, the axis 20 must be aligned with axis 10 within 6 arc seconds to provide maximum power output. Tolerances in the dimensions of the various components can contribute to the error in parallelism between the surface 32 of the rod 28 and surfaces 52 and 55 of mirror 50. In addition, assembly errors that affect alignment include the parallelism of the ring 62 surface 40 with surface 32. The rod 28 usually is adhesively bonded to ferrule 24 permitting inaccuracy no greater than 30 to 50 arc seconds. If the surfaces 40 and 55 are not parallel to surface 32 then surface 52 will be non-parallel with surface 32 and axis 20 will be misaligned with axis 10.

To effect adjustment of the wedge member 60 independent of wedge member 58, tool 106, male key 112, FIGS. 5a and 5b is inserted in recess 100 to rotate solely wedge member 60 in the assembly of FIG. 1. Shaft 84 of tool 80, FIG. 3, passes through recess 100 of member 60 via bore 107 of tool 106. Thus tool 80 does not engage wedge member 60. Male end 86 of tool 80 is received by recess 76 of member 58. To effect rotation of wedge member 58 independent of wedge member 60, tool 80 (FIG. 3) end 86 when inserted in recess 76 rotates solely wedge member 58 in the assembly of FIG. 1. The friction forces exerted by O-ring 48 on the mirror 50 prevent mirror 50 from rotating during the rotation of member 58. The O-ring maintains a uniform force holding the mirror against the wedges in the presence of all environmental conditions. Extreme temperature changes do not affect alignment or strain the mirror even though the coefficients of expansion may be different for the mirror and the adjacent mechanical parts because of the resiliency of the O-ring.

Figure 6:
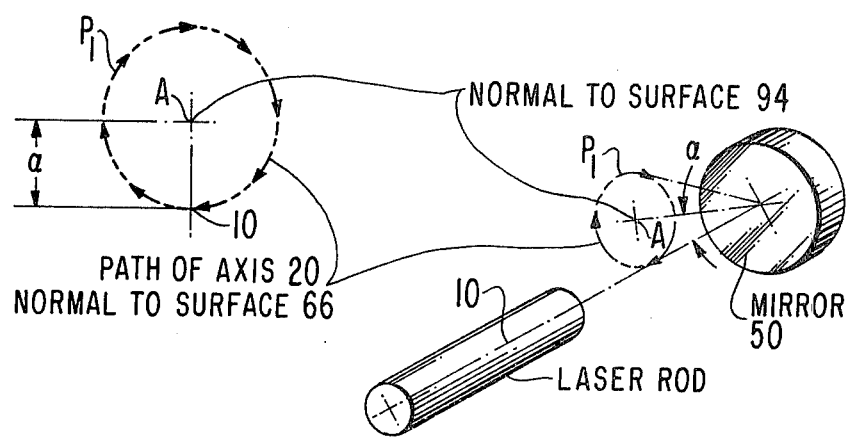

FIG. 6 illustrates the path P1 of axis 20 of mirror 50 when wedge member 58 is rotated 360° about axis A. Axis A is the normal to surface 94 of wedge member 60 whereas P1 is the path of the normal to surface 66 and the mirror 50. Wedge angle $\alpha$ is $\frac{1}{2}$ the maximum displacement of the path of axis 20 as wedge member 58 is rotated in the plane of surface 94, wedge member 60. Thus, the range of adjustment for wedge member 58 is twice the wedge angle or 2 $\alpha$, which may be 12 arc minutes. Since there are two wedge members 58 and 60 the range of adjustment for both wedge members is 4 $\alpha$. The cumulative part assembly errors of module 12 cannot exceed this value. It is to be understood that the angle inaccuracy illustrated herein is illustrative only.

Figure 7:
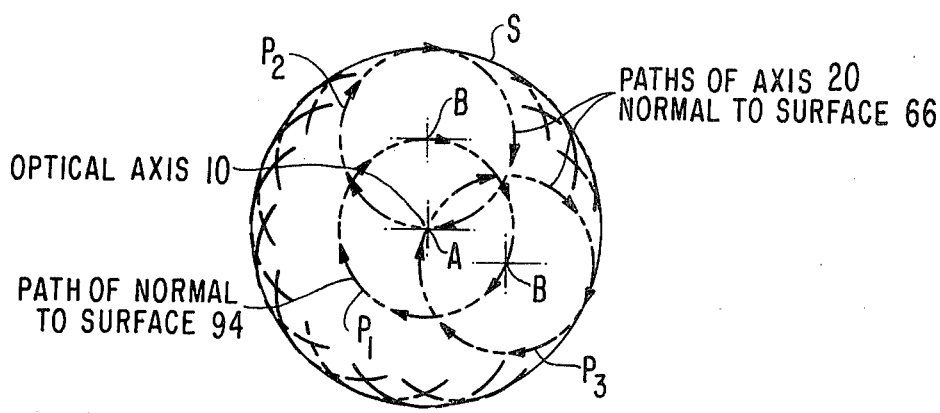

In FIG. 7 the paths P2 and P3 represent several of an infinite number of paths of axis 20 when wedge members 58 and 60 are rotated 360°. The path P1 of the normal to surface 94 defines the path of the center B of paths P2, P3 of the normals to surface 66. Axis A represents optical axis 10 to which axis 20 is to be aligned. Paths P2, P3 describing the axis 20 motion rotate within a circle S. The center B of the path of axis 20 is capable of travelling 360° within circle S which is defined by the paths P2, P3--PN. Thus axis 20 may be located at any point within the circle S by adjustment of either or both wedge members 58 and 60.

Figure 8:
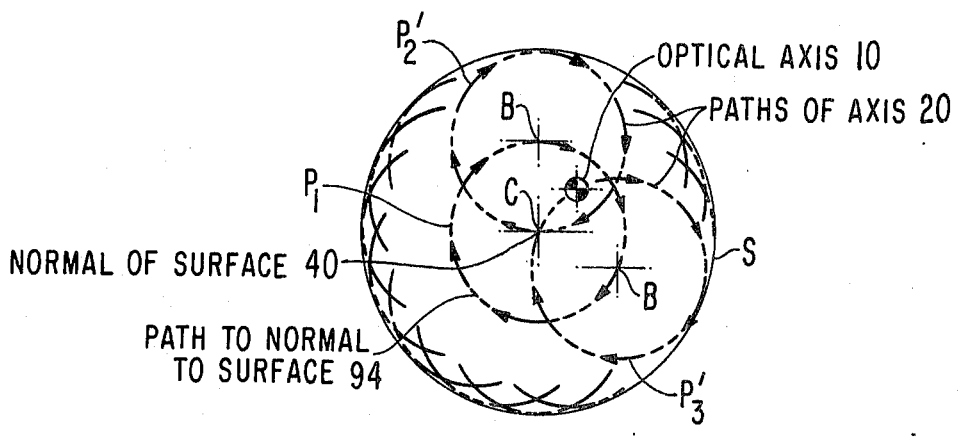

In the worst case, assume that the optical axis 10 is off center with respect to ferrule 24 due to misalignment of the surface 40, FIG. 1. In this case the normal to surface 40 is indicated as the center C of circle S, FIG. 8 which is displaced from axis 10. The path P1 of the number to surface 94 is equidistant from the normal to surface 40 due to wedge member 60 butting against surface 40. The center B of the paths of axis 20 is rotated 360° when the optical wedge member 58 and the optical wedge member 60 are each rotated 360°. Thus it is seen that the optical axis 10 and the paths P2', P3' of axis 20 fall within a range of adjustment which permits their alignment. Paths P2' and P3' represent an infinite number of paths followed by axis 20 as the wedges are rotated.

The tools of FIG. 3 and FIGS. 5a and 5b permit an operator to rotate the respective wedge members 58 and 60 within 3° accuracy or one part in 120 of a 360° motion. For the same rotation, the wedge member adjustment accuracy is 12 arc minutes or 720 arc seconds as noted above herein. The alignment accuracy for the two wedge members thus is 720 arc seconds divided by 120 or 6 arc seconds. It will thus be appreciated that an optical adjustment device has been shown which has a high degree of accuracy, is simple and economical to manufacture and is formed of merely a couple of wedge members and an adjustable but stiffly mounted optical element.

What is claimed is:

1. In combination:
    an optical element having an optical axis,
    means for mounting the element arranged so that the element can tilt about an axis substantially transverse said optical axis and is restrained from rotating substantially about said optical axis,
    first and second wedge members each having a first planar surface tapering toward a second planar surface thereof, said second surfaces having a given spaced relationship when said first surfaces are contiguous, and
    means rotatably mounting said members for wedging said first member between said second member and said element with said first surfaces contiguous, said wedging means and said members being arranged so that each member can rotate with respect to the other member, the rotation of each of said member pivoting the optical axis of said element without rotating the element about the optical axis of said wedge members each including means by which each wedge member can be rotated with respect to the other wedge member.

2. The combination of claim 1 wherein each said members are disks having a given keying arrangement formed in the core thereof.

3. The combination of claim 1 wherein said wedging and mounting means rotatably mounting said members includes a housing having a cylindrical cavity, said element is a mirror disposed in said cylindrical cavity, said mounting means includes an "O-ring" disposed on one side of said mirror and said wedge members are disposed on the other side of said mirror in said cavity.

4. An optical adjusting device comprising:
    a housing having a cylindrical core,
    a first optical element disposed in the cylindrical core, said first element having a first optical axis,
    a second optical element pivotally mounted in the core and having a second optical axis, said housing including means for inhibiting the rotation of said second element substantially about said second optical axis,
    first and second wedge members each having at least one surface tapering toward a second surface of that member, and
    means for wedging said first member between said second member and said second optical element and for wedging said second member between said housing and said first member so that each said member can rotate in said core with respect to the other member without rotating said element therewith to thereby tilt said second element about a third axis to pivot said second element axis into alignment with said first axis, each said wedge members including means for rotating that member with respect to the other member.

5. In an optical system which includes a tubular supporting structure, a reflector within the tubular structure having an optical axis in general alignment with a reference axis within the tubular structure, and rotatable means abutting the rear surface of the reflector for tilting the reflector in response to rotation of the rotatable means about the axis of the tubular means, for the purpose of precisely aligning said optical axis with said reference axis, said reflector tending to rotate along with said rotatable means as the latter rotates in view of the abutting relationship between the two, the improvement comprising:
    means supporting said reflector within said tubular supporting structure for preventing rotation of said reflector while permitting tilting movement thereof.

6. In an optical system as set forth in claim 5, said tubular structure including an annular inner ridge, and said means supporting said reflector comprising a resilient O-ring abutting said ridge along one circular surface thereof and said reflector abutting at its peripheral edge the opposite circular surface of said O-ring, said rotatable means continuously urging said reflector into tight engagement with said O-ring, said O-ring, by virtue of its resilience, permitting said reflector to tilt, and by virtue of the frictional engagement with both said reflector and ridge, preventing rotation of said reflector.

* * * * *

UNITED STATES PATENT OFFICE
CERTIFICATE OF CORRECTION

PATENT NO. : 4,037,942
DATED : July 26, 1976
INVENTOR(S) : Robert Charles Guyer

It is certified that error appears in the above-identified patent and that said Letters Patent are hereby corrected as shown below:

Column 5, line 57, delete "of" after "each", before "said".

Column 5, line 59, insert a comma (,) after "axis".

Column 5, line 59, delete "of" after "axis", before "said".

Signed and Sealed this

Fourth Day of July 1978

[SEAL]

Attest:

RUTH C. MASON
Attesting Officer

DONALD W. BANNER
Commissioner of Patents and Trademarks